United States Patent
Smirnov et al.

(10) Patent No.: US 8,321,883 B2
(45) Date of Patent: Nov. 27, 2012

(54) DISK DRIVE WITH ENCODER HOLDER INDENTATION

(75) Inventors: Viatcheslav Smirnov, Suwon-si (KR); Dong-Woo Rhee, Suwon-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 507 days.

(21) Appl. No.: 12/611,534

(22) Filed: Nov. 3, 2009

(65) Prior Publication Data

US 2010/0153981 A1 Jun. 17, 2010

(30) Foreign Application Priority Data

Dec. 15, 2008 (KR) .......................... 10-2008-0127485

(51) Int. Cl.
*G11B 19/20* (2006.01)
(52) U.S. Cl. ...................................... 720/696
(58) Field of Classification Search .............. 720/600, 720/658, 695–702
See application file for complete search history.

(56) References Cited

U.S. PATENT DOCUMENTS

2008/0001106 A1* 1/2008 Igarashi et al. ............... 250/566
2008/0250435 A1* 10/2008 Kim et al. ..................... 720/600

FOREIGN PATENT DOCUMENTS

| JP | 53-140513 | 12/1978 |
| JP | 7-6961 | 1/1995 |
| JP | 10-319027 | 12/1998 |
| JP | 2008-236928 | 10/2008 |
| KR | 10-2008-0072356 | 8/2008 |
| WO | WO 2006035686 A1 * | 4/2006 |

OTHER PUBLICATIONS

Korean Office Action issued in Korean Patent Application No. 10-2008-0127485, mailed Dec. 22, 2009.
Japanese Office Action, w/ English translation thereof, issued in Japanese Patent Application No. 2009-262375, dated Nov. 1, 2011.
Japanese Office Action, and partial English translation thereof, issued in Japanese Patent Application No. 12/611,534 dated Apr. 3, 2012.

* cited by examiner

*Primary Examiner* — Nathan Danielsen
(74) *Attorney, Agent, or Firm* — McDermott Will & Emery LLP (57) ABSTRACT

A disk drive is disclosed. The disk drive can include includes a spindle motor, which can rotate a disk; an encoder, which can detect the rotational speed of the disk; an encoder holder, which secures the encoder; and a base plate, which supports the spindle motor, and in which a holder indentation is formed for inserting the encoder holder in. Certain embodiments of the invention allow easy height adjustments for the encoder holder, so that the encoder may maintain a particular distance from the disk, and also allow the encoder to be fitted onto the base plate, even in cases where the base plate has a limited mounting area.

9 Claims, 11 Drawing Sheets

DISK DRIVE WITH ENCODER HOLDER INDENTATION

CROSS-REFERENCE TO RELATED APPLICATIONS

This application claims the benefit of Korean Patent Application No. 10-2008-0127485, filed with the Korean Intellectual Property Office on Dec. 15, 2008, the disclosure of which is incorporated herein by reference in its entirety.

BACKGROUND

1. Technical Field

The present invention relates to a disk drive.

2. Description of the Related Art

A disk drive is a device for writing data onto a disk and reading data written on a disk. In performing such reading/writing operations, it is important that the disk be rotated at a constant speed.

To keep the disk drive rotating at a constant speed, an encoder may be required, which measures the rotational speed of the spindle motor that rotates the disk. Here, in order for the encoder to measure the rotational speed, the encoder may have to maintain a certain distance from the disk. To this end, the encoder is commonly placed on a resin mold stacked on a board, so that the distance from the disk may be adjusted.

However, with current trends towards thinner disk drives, the gap between the disk and the board is becoming narrower, and thus it may be difficult to provide an adequate distance between the encoder and the disk.

SUMMARY

One aspect of the invention provides a disk drive, in which a distance is provided between an encoder and a disk.

Another aspect of the invention provides a disk drive that includes a spindle motor, which can rotate a disk; an encoder, which can detect the rotational speed of the disk; an encoder holder, which secures the encoder; and a base plate, which supports the spindle motor, and in which a holder indentation is formed for inserting the encoder holder in.

Here, the holder indentation can be formed to perforate through the base plate.

The base plate can include a securing protrusion that protrudes from an inner wall of the holder indentation towards the inside of the holder indentation, while a securing indentation can be formed in the encoder holder in correspondence with the securing protrusion so as to hold the securing protrusion.

Here, the securing protrusion can be shaped as a bottleneck, having a larger width at the end.

The holder indentation can be open towards the outer side of the base plate.

In certain embodiments, the disk drive can further include a board mounted on the base plate, where the board can be electrically connected with the encoder.

The encoder holder can include a mounting protrusion, which may determine the mounting position of the board, and a mounting indentation can be formed in the board, such that the mounting protrusion may be inserted in the mounting indentation.

The disk drive can additionally include an encoder connector made from a conductive material that connects the board with the encoder.

Here, the encoder connector may form lands on the encoder holder that may be electrically connected with the encoder.

The board can include a flexible board, a part of which may be interposed between the encoder holder and the encoder, to be electrically connected with the encoder.

Additional aspects and advantages of the present invention will be set forth in part in the description which follows, and in part will be obvious from the description, or may be learned by practice of the invention.

DETAILED DESCRIPTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The disk drive according to certain embodiments of the invention will be described below in more detail with reference to the accompanying drawings. Those components that are the same or are in correspondence are rendered the same reference numeral regardless of the figure number, and redundant descriptions are omitted.

Figure 1:
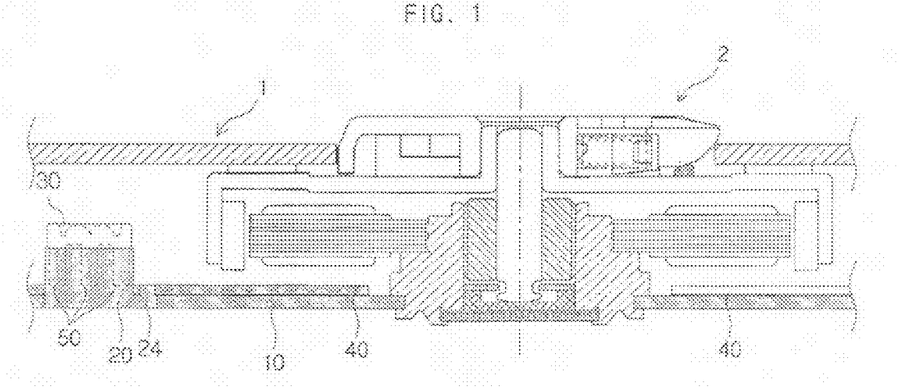
FIG. 1 is a cross-sectional view of a disk drive according to an embodiment of the invention.
Figure 2:
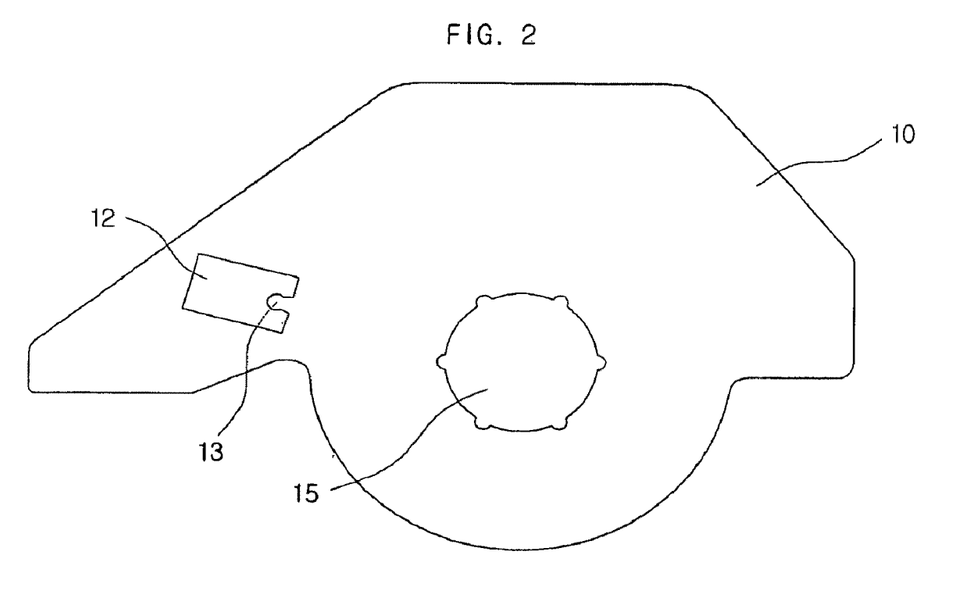
FIG. 2 and FIG. 7 are plan views of a base plate in a disk drive according to an embodiment of the invention.
Figure 3:
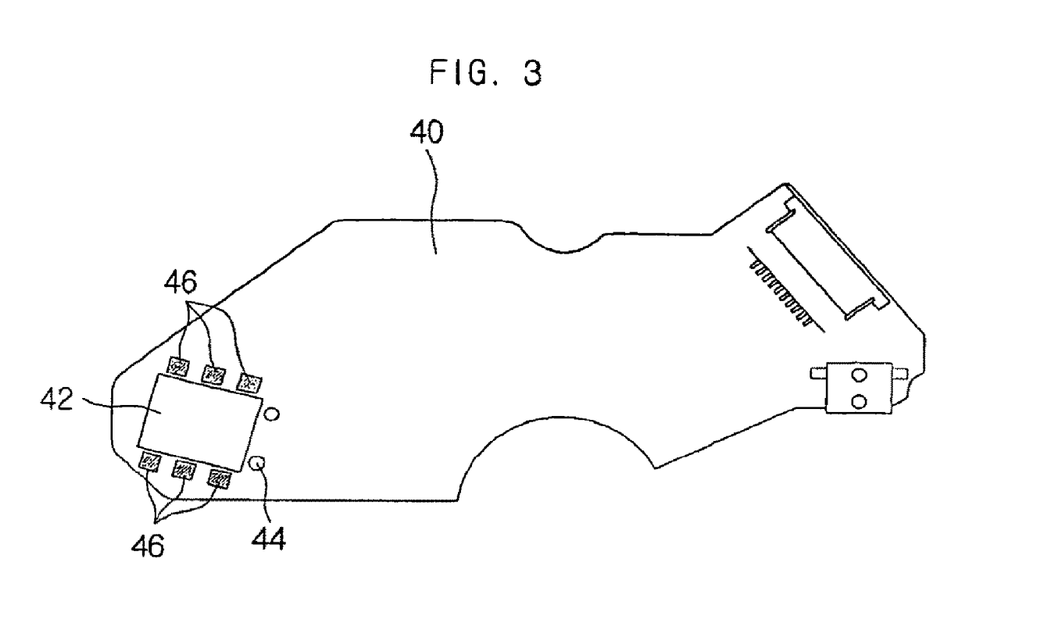
FIG. 3 is a plan view of a board in a disk drive according to an embodiment of the invention.
Figure 4:
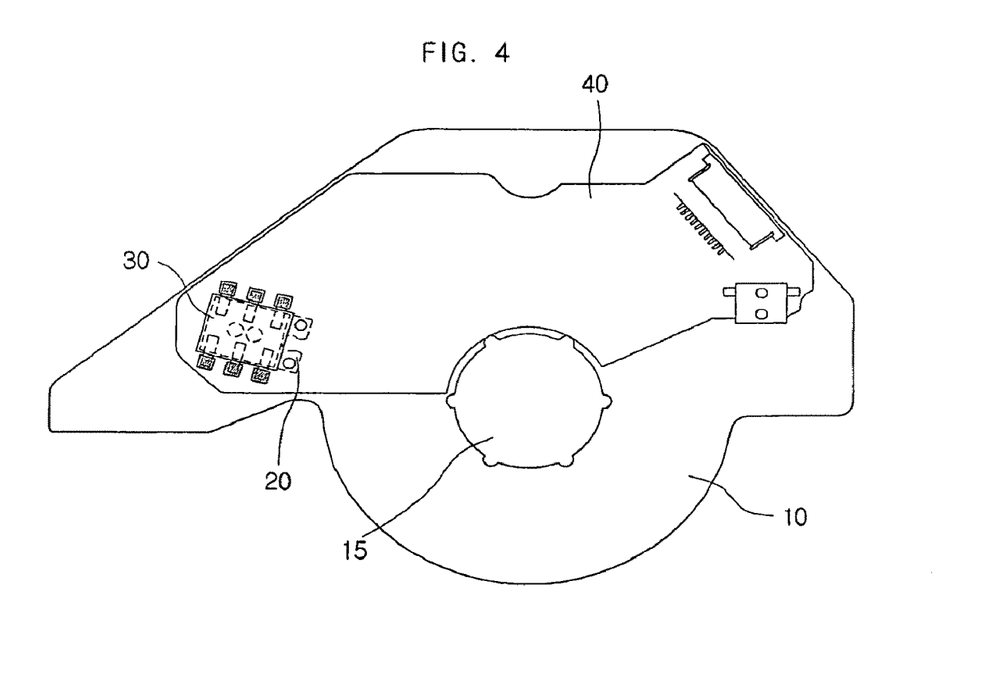
FIG. 4 is a plan view of a disk drive according to an embodiment of the invention.
Figure 5:
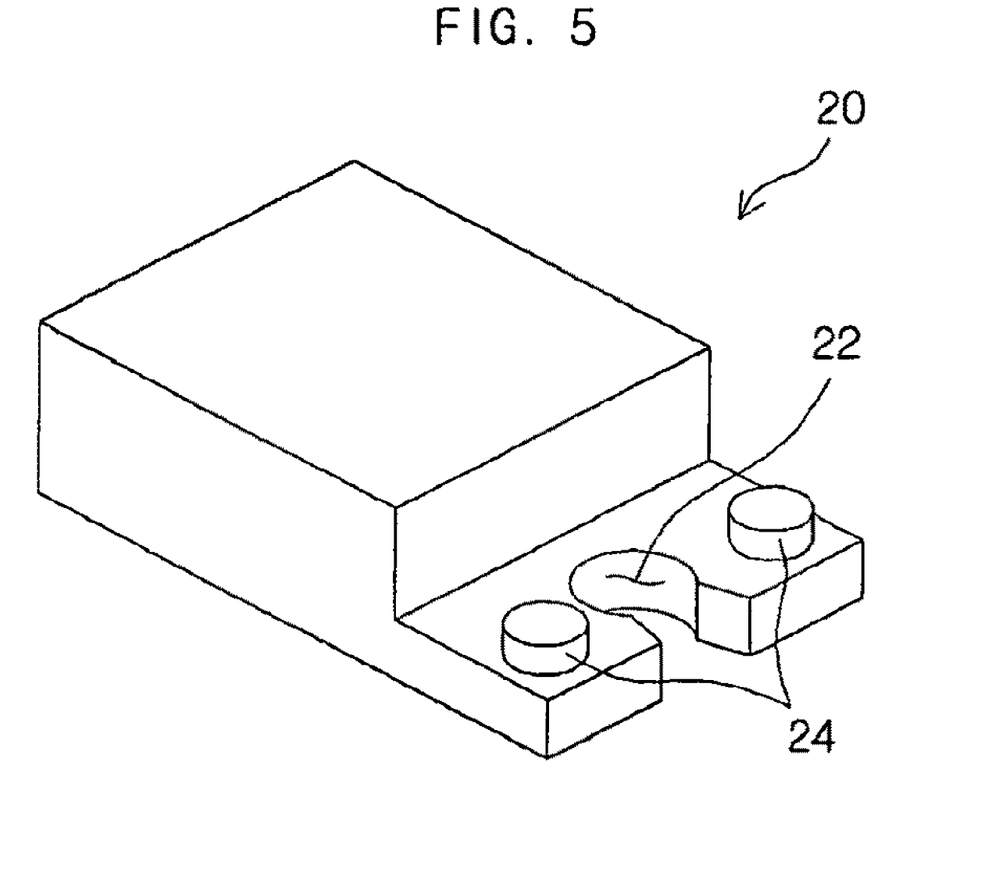
FIG. 5 is a perspective view of an encoder holder in a disk drive according to an embodiment of the invention.
Figure 6:
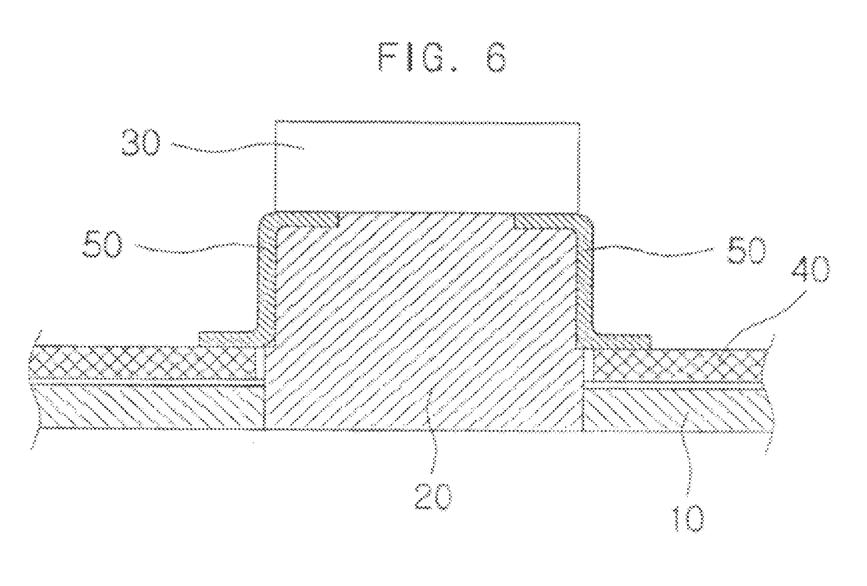
FIG. 6 is a cross-sectional view of an encoder connector in a disk drive according to an embodiment of the invention.
Figure 7:
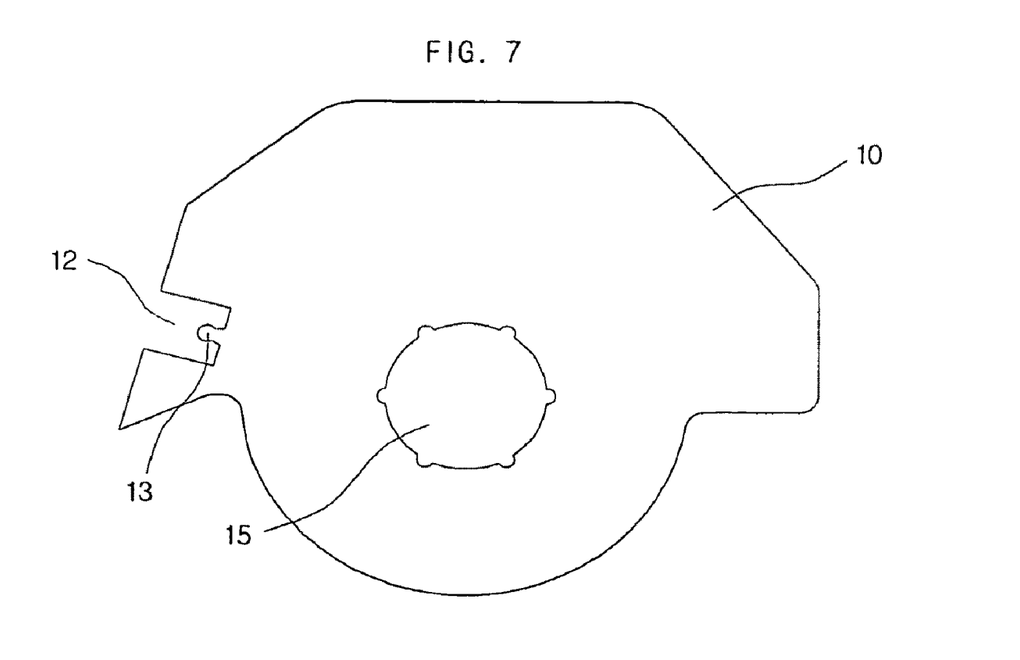

FIG. 1 is a cross-sectional view of a disk drive according to an embodiment of the invention. FIG. 2 and FIG. 7 are plan views of a base plate in a disk drive according to an embodiment of the invention, and FIG. 3 is a plan view of a board in a disk drive according to an embodiment of the invention. FIG. 4 is a plan view of a disk drive according to an embodiment of the invention. FIG. 5 is a perspective view of an encoder holder in a disk drive according to an embodiment of the invention, and FIG. 6 is a cross-sectional view of an encoder connector in a disk drive according to an embodiment of the invention.

In FIG. 1 through FIG. 7, there are illustrated a disk 1, a spindle motor 2, a base plate 10, a holder indentation 12, a securing protrusion 13, a spindle motor insertion hole 15, an encoder holder 20, a securing indentation 22, mounting protrusions 24, an encoder 30, a board 40, an encoder holder hole 42, mounting indentations 44, encoder connector contacts 46, and encoder connectors 50.

A disk drive according to an embodiment of the invention can include a spindle motor 2, which rotates a disk 1, an encoder 30, which detects the rotational speed of the disk 1, an encoder holder 20, which secures the encoder 30, and a base plate 10, which supports the spindle motor 2 and in which a holder indentation 12 is formed to have the encoder holder 20 inserted. This arrangement makes it easy to adjust the height of the encoder holder 20, so that the encoder 30 may be kept at a particular distance from the disk 1.

The spindle motor 2 may rotate the disk 1. A disk chucking device for detachably securing the disk 1 can be installed on the upper side of the spindle motor 2.

The spindle motor 2 can be composed mainly of a rotor and a stator. The rotor can be coupled to a shaft and can be rotated by the interaction between the stator and the magnetic field generated by a magnet. The magnet may cover the stator and may be positioned to face the stator. The shaft can be coupled to the rotor and can be rotatably supported by a bearing.

The encoder 30 may detect the rotation speed of the disk 1. The encoder 30 may recognize an identification mark formed on the disk 1 to detect the rotational speed of the disk 1 and thus detect the rotational speed of the spindle motor 2. Referring to FIG. 1, the encoder 30 can be installed in a position corresponding with the position of the identification mark on the disk 1 so as to detect the rotational speed of the disk 1, and a particular distance may be required between the encoder 30 and the disk 1.

The encoder holder 20 may secure the encoder 30, and may be fitted onto the base plate 10 described later. As illustrated in FIG. 2, the encoder 30 may be positioned at a particular height so as to keep a particular distance from the disk 1.

The base plate 10 may include a holder indentation 12, in which the encoder holder 20 may be inserted and secured. The base plate 10 may also support the spindle motor 2.

In order that the encoder 30 may be kept at a particular distance from the disk 1 for various heights of the spindle motor 2, the holder indentation 12 can be formed in the base plate 10 and the encoder holder 20 can be fitted in correspondence to the height of the disk 1. In this way, a particular gap can be obtained between the disk 1 and the encoder holder 20.

In particular, since the encoder holder 20 can be inserted directly into the base plate 10, the height of the encoder 30 can be significantly lowered, allowing for a required distance from the disk 1 even with thinner spindle motors.

Here, the holder indentation 12 can be formed to perforate through the base plate 10, so that the height of the encoder 30 may be lowered even more.

Also, the base plate 10 can include at least one securing protrusion 13 that protrudes from the inner wall of the holder indentation 12 towards the inside of the holder indentation 12, while the encoder holder 20 can include at least one securing indentation 22 shaped in correspondence with the securing protrusion 13 to hold the securing protrusion 13. In this way, the encoder holder 20 may be firmly secured in the holder indentation 12.

Here, the securing protrusion 13 can have a bottleneck-like shape, having a greater width at the end portion, so as to provide a firmer support. This arrangement can be especially effective in preventing the encoder 30 from becoming detached, in cases where the holder indentation 12 is shaped to have a portion open towards the outer side.

In a more detailed example, a spindle motor insertion hole 15 for supporting the spindle motor 2 can be formed in the base plate 10 according to this embodiment, as illustrated in FIG. 1 and FIG. 2, whereby a bearing holder of the spindle motor 2 may be inserted into the base plate 10 and caulked.

Also, the perforated holder indentation 12, into which the encoder holder 20 is inserted, can be formed pointing towards the center of the spindle motor insertion hole 15. Having the holder indentation 12 point towards the center of the spindle motor 2 can make it easier to align the encoder 30 in a position pointing towards the center of the spindle motor 2. Furthermore, the disk drive can be fabricated to have various heights by changing only the encoder holder 20, with the position and shape of the holder indentation 12 unaltered, so that design changes can be minimized. As such, it is possible to implement standardized designs for the base plate 10 and the encoder holder 20.

At least one securing protrusion 13, shaped as a bottleneck and having a greater width at the end, can be formed within the holder indentation 12. Also, as illustrated in FIG. 5, at least one securing indentation 22 can be formed in the encoder holder 20, in which the bottleneck-shaped securing protrusion 13 may be held and secured. This arrangement may allow the encoder holder 20 to be more firmly secured when inserted into the base plate 10.

In particular, in cases where there is little space on the base plate 10, so that the holder indentation 12 has a portion opened outwards instead of being formed entirely within the boundary of the base plate 10, as in the example illustrated in FIG. 7, the securing protrusion 13 and securing indentation 22 can serve to secure the encoder holder 20. Here, the bottleneck-like shape of the securing protrusion 13, where the width is greater at the end, may prevent the encoder holder 20 from becoming detached in the direction of the open portion. Thus, even when a part of the base plate 10 has to be removed due to a lack of space, it may still be possible to fit the encoder holder 20 and the encoder 30 without additional design changes.

A disk drive according to this embodiment can further include a board 40 electrically connected with the encoder 30. The board 40 may serve to supply electrical power to the encoder 30 and receive the rotation speed data detected by the encoder 30. The board 40 can be mounted on the base plate 10.

To designate the position where the board 40 is to be mounted, mounting protrusions 24 can be formed on the encoder holder 20, and mounting indentations 44 can be formed in the board 40, in accordance with a predetermined mounting position. Thus, when mounting the board 40 on the base plate 10, the position of the board 40 may readily be determined.

Referring to FIG. 3 and FIG. 4, in a more detailed example, a board 40 according to the present embodiment may include an encoder holder hole 42 through which the encoder holder 20 may be inserted, and mounting indentations 44 into which the mounting protrusions 24 of the encoder holder 20 may be inserted. This arrangement makes it possible to position the board 40 after fitting the encoder holder 20 on the base plate 10, so that the board 40 may readily be secured while maintaining a low height for the encoder holder 20.

The disk drive may further include encoder connectors 50, which electrically connect the board 40 with the encoder 30 and may therefore be used to supply the required electrical power from the board 40 to the encoder 30 and transmit the rotation speed data to the board 40. A conductive material, such as metal, can be used for the encoder connectors 50.

In a more detailed example, encoder connector contacts 46 can be formed on the board 40 and connected to the encoder 30 by metallic encoder connectors 50. In particular, the encoder connectors 50 can be shaped as lands formed on the upper portion of the encoder holder 20, as illustrated in FIG. 6, to allow an easier electrical connection to the encoder 30.

Figure 8:
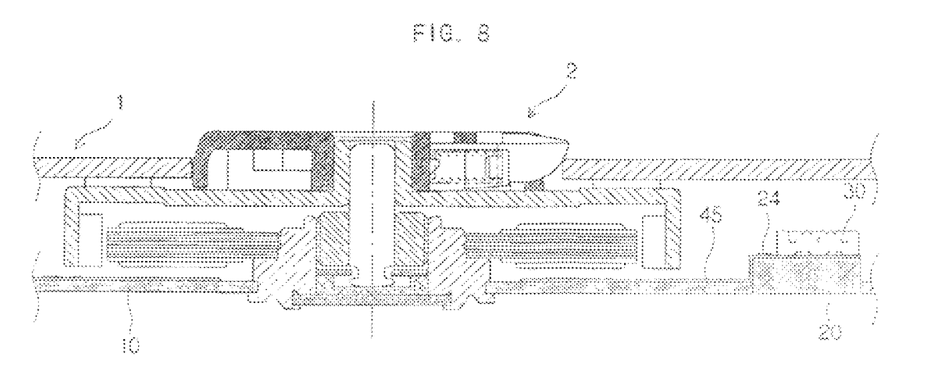
FIG. 8 is a cross-sectional view of a base plate in a disk drive according to another embodiment of the invention.
Figure 9:
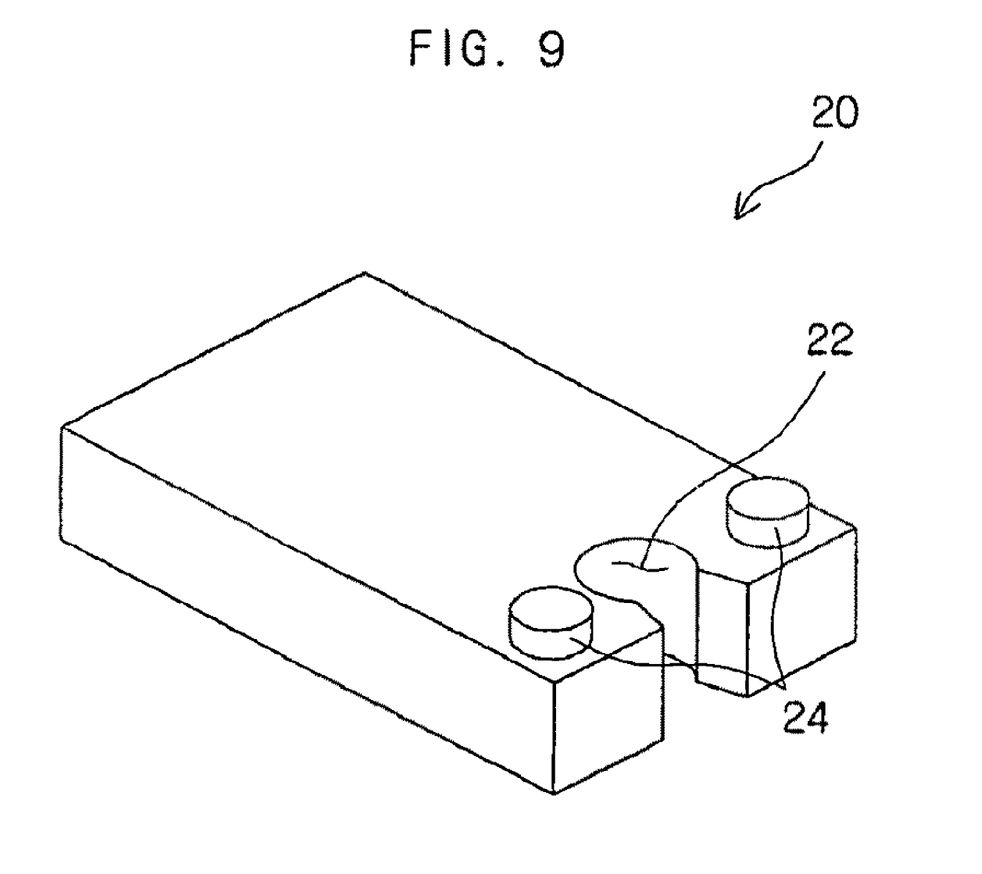
FIG. 9 is a perspective view of an encoder holder in a disk drive according to another embodiment of the invention.

FIG. 8 is a cross-sectional view of a base plate in a disk drive according to another embodiment of the invention, and FIG. 9 is a perspective view of an encoder holder in a disk drive according to another embodiment of the invention.

A disk drive according to another embodiment of the invention may employ a thin flexible board 45 so as to provide a slimmer design for the disk drive, compared to that of the previously disclosed embodiment. In accordance with the reduced distance from the disk, a shorter encoder holder 20 may be used, compared to that of the previously disclosed embodiment. Here, by having a portion of the flexible board 45 positioned between the encoder holder 20 and the encoder 30, a direct electrical connection can be obtained between the flexible board 45 and the encoder 30.

Figure 10:
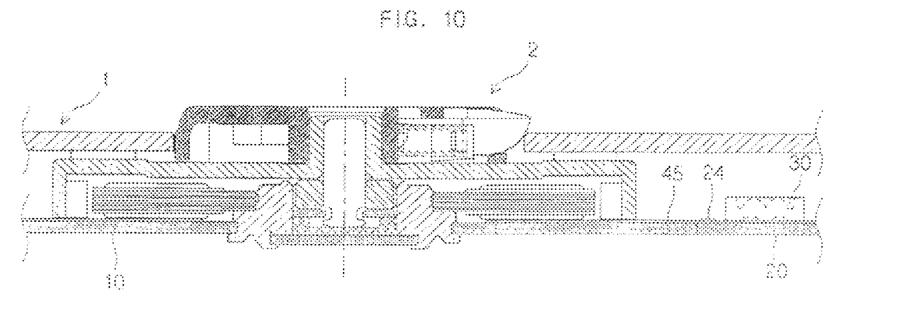
FIG. 10 is a plan view of a base plate in a disk drive according to yet another embodiment of the invention.
Figure 11:
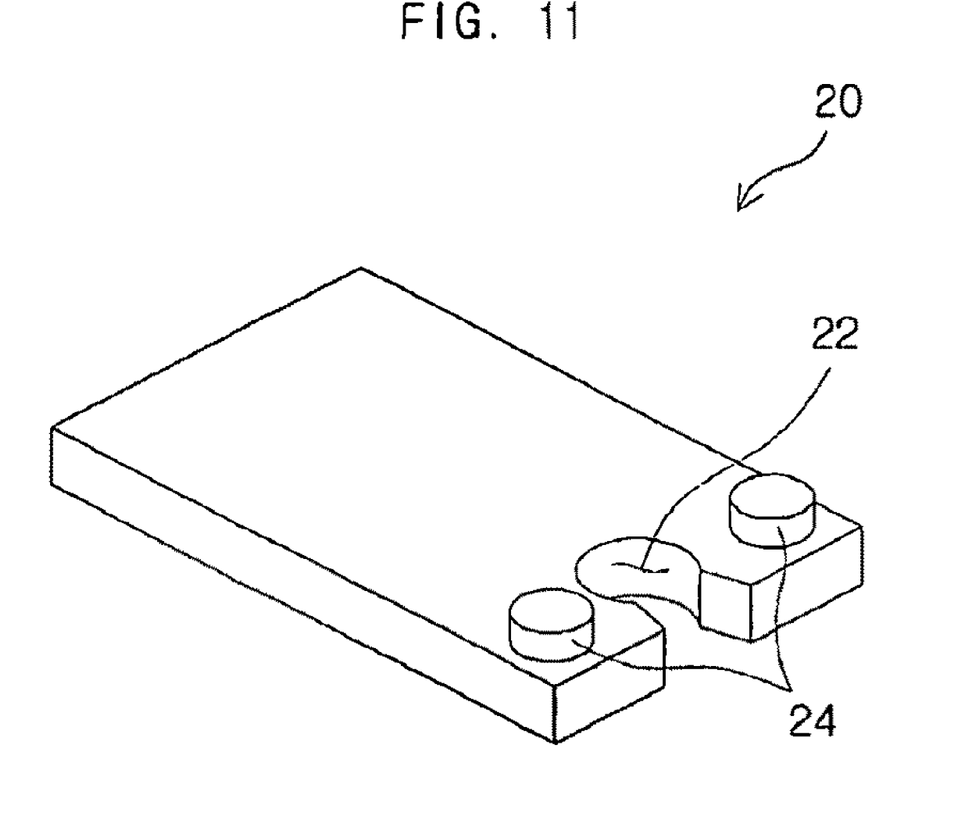
FIG. 11 is a perspective view of an encoder holder in a disk drive according to yet another embodiment of the invention.

FIG. 10 is a plan view of a base plate in a disk drive according to yet another embodiment of the invention, and FIG. 11 is a perspective view of an encoder holder in a disk drive according to yet another embodiment of the invention.

In order to provide a slimmer design for the disk drive compared to those of the first and second disclosed embodiments, a disk drive according to yet another embodiment of the invention may employ an encoder holder 20 having the same thickness as that of the base plate 10. With this arrangement, the encoder holder 20 may support the encoder 30 without protruding above the base plate 10.

As described above, a disk drive according to an embodiment of the invention makes it possible to respond to disk drives of various heights without special design changes, simply by altering the height of the encoder holder 20. As such, embodiments of the invention may readily be used not only in ultra slim disk drives (approximately 9.5 mm) but also in super ultra slim disk drives (approximately 7.0 mm).

As set forth above, certain embodiments of the invention allow easy height adjustments for the encoder holder, so that the encoder may maintain a particular distance from the disk, and also allow the encoder to be fitted onto the base plate, even in cases where the base plate has a limited mounting area.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

Many embodiments other than those set forth above can be found in the appended claims.

What is claimed is:

1. A disk drive, comprising:
   a spindle motor configured to rotate a disk;
   an encoder configured to detect a rotational speed of the disk;
   an encoder holder securing the encoder; and
   a base plate supporting the spindle motor and comprising a holder indentation formed therein, the holder indentation having the encoder holder disposed therein, wherein:
   the base plate comprises a securing protrusion protruding from an inner wall of the holder indentation toward an inside of the holder indentation, and
   a securing indentation is formed in the encoder holder in correspondence with the securing protrusion to hold the securing protrusion.

2. The disk drive of claim 1, wherein the holder indentation perforates through the base plate.

3. The disk drive of claim 1, wherein the securing protrusion has a bottleneck shape and has a larger width at an end thereof.

4. The disk drive of claim 3, wherein the holder indentation opens towards an outer side of the base plate.

5. The disk drive of claim 1, further comprising a board mounted on the base plate, the board being electrically connected with the encoder.

6. The disk drive of claim 5, wherein the encoder holder comprises a mounting protrusion, the mounting protrusion configured to determine a mounting position of the board, and
   a mounting indentation is formed in the board, the mounting indentation having the mounting protrusion inserted therein.

7. The disk drive of claim 5, further comprising an encoder connector connecting the board with the encoder, the encoder connector made from a conductive material.

8. The disk drive of claim 7, wherein the encoder connector forms at least one land on the encoder holder, the land being electrically connected with the encoder.

9. The disk drive of claim 5, wherein:
   the board comprises a flexible board, and
   a part of the flexible board is interposed between the encoder holder and the encoder, the flexible board being electrically connected with the encoder.

* * * * *